US006826268B2

(12) United States Patent
Adams

(10) Patent No.: US 6,826,268 B2
(45) Date of Patent: Nov. 30, 2004

(54) METHOD FOR OVERLOAD CONTROL IN A TELECOMMUNICATIONS NETWORK AND APPARATUS THEREFOR

(75) Inventor: Richard Anthony Adams, Chippenham (GB)

(73) Assignee: Lucent Technologies Inc., Murray Hill, NJ (US)

( * ) Notice: Subject to any disclaimer, the term of this patent is extended or adjusted under 35 U.S.C. 154(b) by 265 days.

(21) Appl. No.: 10/119,517

(22) Filed: Apr. 10, 2002

(65) Prior Publication Data

US 2002/0159576 A1 Oct. 31, 2002

(30) Foreign Application Priority Data

Apr. 25, 2001 (GB) ............................................. 0110155

(51) Int. Cl.⁷ ............................................. H04M 15/00
(52) U.S. Cl. ............................. 379/112.04; 379/112.01; 379/112.02; 379/112.03; 379/112.1; 379/133; 379/221.03
(58) Field of Search ........................ 379/112.01, 112.02, 379/112.03, 112.04, 112.05, 112.08, 112.1, 32.01, 32.02, 133, 134, 137, 138, 139, 221.03, 221.07

(56) References Cited

U.S. PATENT DOCUMENTS

| 5,425,086 | A | * | 6/1995 | Hidaka et al. ........... 379/32.01 |
| 5,450,483 | A | * | 9/1995 | Williams ................ 379/112.04 |
| 5,581,610 | A | * | 12/1996 | Hooshiari .................... 379/133 |
| 5,768,258 | A | | 6/1998 | Van As |
| 5,881,137 | A | * | 3/1999 | Ginzboorg et al. ..... 379/112.04 |
| 5,933,481 | A | * | 8/1999 | MacDonald ................ 379/137 |
| 5,949,862 | A | * | 9/1999 | Fukuzawa et al. ...... 379/112.01 |
| 6,252,950 | B1 | * | 6/2001 | Duty et al. .................. 379/111 |
| 6,327,361 | B1 | * | 12/2001 | Harshavardhana et al. . 379/230 |
| 6,330,313 | B1 | * | 12/2001 | Hunt .......................... 379/133 |

FOREIGN PATENT DOCUMENTS

| EP | 0 425 202 A3 | 10/1990 | ........... H04L/12/56 |
| EP | 0 425 202 A2 | 10/1990 | ........... H04L/12/56 |

* cited by examiner

*Primary Examiner*—Quoc Tran

(57) ABSTRACT

A method of suppressing overload in a telecommunications network involves the second node (1) receiving a signal that calls it has sent to a target node are being rejected and (2) reducing the rate of calls it sends to the target node in response.

The network could be a UMTS or other third generation (36) network.

16 Claims, 6 Drawing Sheets

METHOD FOR OVERLOAD CONTROL IN A TELECOMMUNICATIONS NETWORK AND APPARATUS THEREFOR

CROSS REFERENCE TO RELATED APPLICATION

This application claims priority of Great Britain Application No. 0110155.9 filed on Apr. 25, 2001.

FIELD OF THE INVENTION

The present invention relates to a method for overload control in a telecommunications network. The present invention also relates to apparatus therefor.

The network can be a UMTS or other third generation (3G) network.

BACKGROUND OF THE INVENTION

Calling rate patterns in telecommunication networks typically have predictable daily profiles with occasional very high peaks superimposed. These peaks can be caused by events such as telephone voting due to a television program, or disasters, etc.

Although it would be possible to dimension a network to handle such peak traffic, it would be uneconomic to do so. In addition, mass call events frequently have several source nodes, but are focussed on a few, or just one, destination, and will overload it. Network dimensioning cannot solve a destination's overload, and some form of overload control is required to manage peak traffic.

Many mass call events are unexpected, so the control needs to be automatic. Overloads often increase rapidly (within seconds in some cases), persist for minutes with large fluctuations in amplitude, and dissipate over a somewhat longer period. This means that the control needs to be fast in application, and be able to adapt readily to changing loads.

Ideally, the nodes whose callers caused the overload event should exert control, since they have the possibility of informing these callers of the situation. However, the target node for the overload needs to be able to control its input until the sources have time to react. Here, actions by the target node are referred-to as "local overload control". The target node often does the minimum work necessary upon calls to control its local overload, in order to protect itself in the short term. Such local overload control has the danger that, if callers are not told promptly of the overload, they will reattempt their calls. This could cause the overload to spread through the network.

Hence, network signalling systems such as International Telecommunications Union ITU-T Signalling System No.7 (SS No.7) have defined as part of their protocol messages and procedures to be used by a target node to inform its adjacent source nodes when it is in overload. SS No.7 has defined an "automatic congestion control" (ACC) procedure and an "automatic congestion level" (ACL) parameter to be used in all call release messages by an overloaded node. The ACL parameter has one of two possible values "less severe" or "more severe", but the meaning of these values at the target node is not further defined. The behaviour of the target node is also not defined.

Source nodes are expected to reduce their traffic towards the overloaded node when they receive a release message containing an ACL parameter from it, and if possible they inform their local callers of the situation. Such attempted restriction of traffic towards a remote node is called "remote overload control" here. The speed at which traffic can be reduced, and the degree of reduction is not defined in SS No.7, but they depend upon the traffic level, the implementation of the source and target nodes, and the network.

In order to reduce the amount of call re-attempts, the traffic offered by sources to the target node should be held close to, preferably just under, the capacity of the target node. This ensures its optimum performance during emergencies.

The work performed by source nodes in remote overload control should not cause the source itself to be come overloaded.

Many solutions for remote overload control in SS No.7 maintain an overload level indication for a remote target node, the indication depends upon the value of the ACL parameter received, and frequently upon the rate at which release messages containing ACL parameters are received from it. A timer is started at the reception of the first release message containing an ACL parameter, which is restarted if such a release message is received before the timer expires. The overload level indication is increased upon reception of a release message containing an ACL parameter, and decreased if the timer expires. When the indicated overload level reaches zero, traffic restriction is stopped.

Some solutions limit the speed at which the overload level indication can be increased, by use of a short guard timer which is started upon reception of the first release message containing an ACL parameter. Further such release messages received whilst the short timer is running are ignored in the remote overload control procedure. Receipt of a release message containing an ACL parameter when the short timer is not running, whilst the long timer is running, cause the short timer to be restarted, the long timer to be restarted, and the overload indication to be updated.

Some solutions for remote overload control use a form of proportional reduction of traffic offered to the sources for the target node, the proportion depending upon the indicated overload level. Other solutions use some form of rate limiting mechanism, such as a leaky bucket, the rate of calls offered by the source node to the target depending upon the indicated overload level. Rate limiting schemes are better than proportional discard schemes in that they limit absolutely the traffic offered to the target node.

It is known from U.S. Pat. No. 5,450,483 to provide a rate limiting scheme using a leaky bucket in source nodes, whose rate is set by another leaky bucket there recording the rate at which call rejects are received from the overloaded target node. This requires the target to be kept just over its overload level. It uses the ISDN User Part ACC mechanism (described in ITU-T Recommendation Q.764 (09/97) section 2.11).

It is known from International patent application WO99/38341 to provide a scheme which uses a continuous "overload control level" (OCL), whose value is set by receipt of call rejects as in Q.764 section 2.11, against calls released normally. The OCL value determines what proportion of calls offered to the source for the target will be discarded. It is not an absolute rate limiting scheme.

Each known remote overload control method has its own limitations. Methods using an overload indication level at the source node tend to impose an initial traffic restriction at the minimum discrete level, the restriction increases with further overload indications. If the onset of overload is rapid, and the offered traffic is high, the initial restriction level tends to be so low that the target is pushed into an overload state from which it can recover only by extreme measures such as message discard.

With a discrete number of overload levels, in order to get a smooth response the number of levels tends to be high. This causes a slow response to sudden overload. In addition, the response by the source to removal of the overload tends to be slow, and the traffic offered to the target by the source tends to drop significantly there.

If the restriction method is to discard a proportion of the offered traffic according to the overload indication, a severe traffic overload offered to the source can result in a severe traffic overload offered by the source to the target.

The method described in U.S. Pat. No. 5,450,483 mentioned above requires the target node to be kept just over its overload level. If the target node employs any technique such as discard of some call set up messages, or delays rejection of them to reduce the possibility of reattempt by the caller, the apparent overload level recorded need not be the actual overload level, and the behaviour of the network might be different from that expected. In addition, the efficiency of the target is reduced by its need to reject calls.

The method described in WO99/38341 mentioned above requires a mix of release messages with and without ACL parameters to fix the OCL value. It uses a proportional discard scheme, and hence is liable to be slow in reacting to a rapid overload. In addition, some types of call (e.g. those which originate in the public switched telephone network and destined to the Internet) are cleared down in normal circumstances only by the caller. Consequently, a switch used to connect to the Internet will clear down calls only when overloaded, and so would normally not send a release message without an ACL parameter. Thus a source local exchange using this method for remote overload control sending calls to a once overloaded Internet-connected switch will assume it is still overloaded.

Other known methods have a serious weakness, which is caused by use of a timer to reduce restriction to the target node. Overloads can be of any duration, if expiry of a timer causes the restriction to be lifted or even just decreased at the source, with the traffic offered to the source for the target still greater than the target's capacity, the target will enter overload again. During long duration periods of high offered traffic, the target thus oscillates into and out of overload.

SUMMARY OF THE INVENTION

The present invention provides a method of suppressing overload of a first node in a telecommunications network by the steps of a second node: receiving a signal indicating that a call directed from the second node to the first node has bee rejected and in response restricting the rate of transmission of calls from the second nod to the first node to a predetermined level, and monitoring duration through a predetermined time period wherein if a further signal indicating that a call directed from the second node to the first node has been rejected is received during the predetermined time period, the rate of transmission of calls from the second node to the first is restricted further to a further reduced predetermined level and duration through a further predetermined period is monitored.

The preferred methods react quickly to a sudden onset of overload, they both keep the target just under overload during the duration of high offered traffic at the source. They do not allow the target to oscillate into and out of overload. Variations of load offered to the source node for the target, above the target's capacity, are filtered out by the source node.

Preferably the or each predetermined level of restriction is selected dependent upon the measured rate of calls ($D_{measured}$) from the second node accepted by the first node.

As the level of restriction ("leaky bucket" rate) is determined by the measured capacity of the target node, any changes to that capacity cause the leaky bucket rate to change. Thus modifications to the software or hardware at the target node which cause its capacity to change are automatically catered—for, they do not need management intervention at the source. Management intervention at the source is also not required if there is a change in the number of other sources in the network.

Preferably the steps of restricting and monitoring are repeated until no signal indicating that a call directed from the second node to the first node has been rejected is received during the latest predetermined period.

The source nodes do not need to communicate with each other in order to jointly control overload at a target node.

The present invention also provides a telecommunications network comprising a first node and a second node, the second node comprising receiving means operative to receive a signal indicating that a call directed from the second node to the first node has been rejected, and restricting means operative in response to both restrict the rate of transmission of calls from the second node to the first node to a predetermined level and start its timer to monitor duration through a predetermined period, wherein in use, if a further signal indicating that a call directed from the second node has been ejected is received by the receiving means during the predetermined period being measured by the timer, the restricting means reduces the rate of transmission of calls from the second node to the first node to a further predetermined level and restarts the timer.

The present invention also provides a telecommunications apparatus comprising receiving means operative to receive a signal indicating that a call sent from said apparatus has been rejected, the apparatus comprising restricting means operative in response to restrict the rate of calls sent out and start its timer to monitor duration through a predetermined period, wherein in use, if a further signal indicating that a call sent from said apparatus has been rejected is received by said receiving means during the predetermined period measured by the timer, the restricting means further reduces the rate of calls sent out.

The preferred methods are not limited to remote overload control by one node of one other in a telecommunications network. Each source node can monitor all target nodes with which it was concerned, so that if any overload of any target occurs, the associated source nodes can then perform the corrective action of automatic congestion control.

BRIEF DESCRIPTION OF THE DRAWINGS

A preferred embodiment of the present invention will now be described by way of example and with reference to the Figures in which.

DETAILED DESCRIPTION

Figure 1:
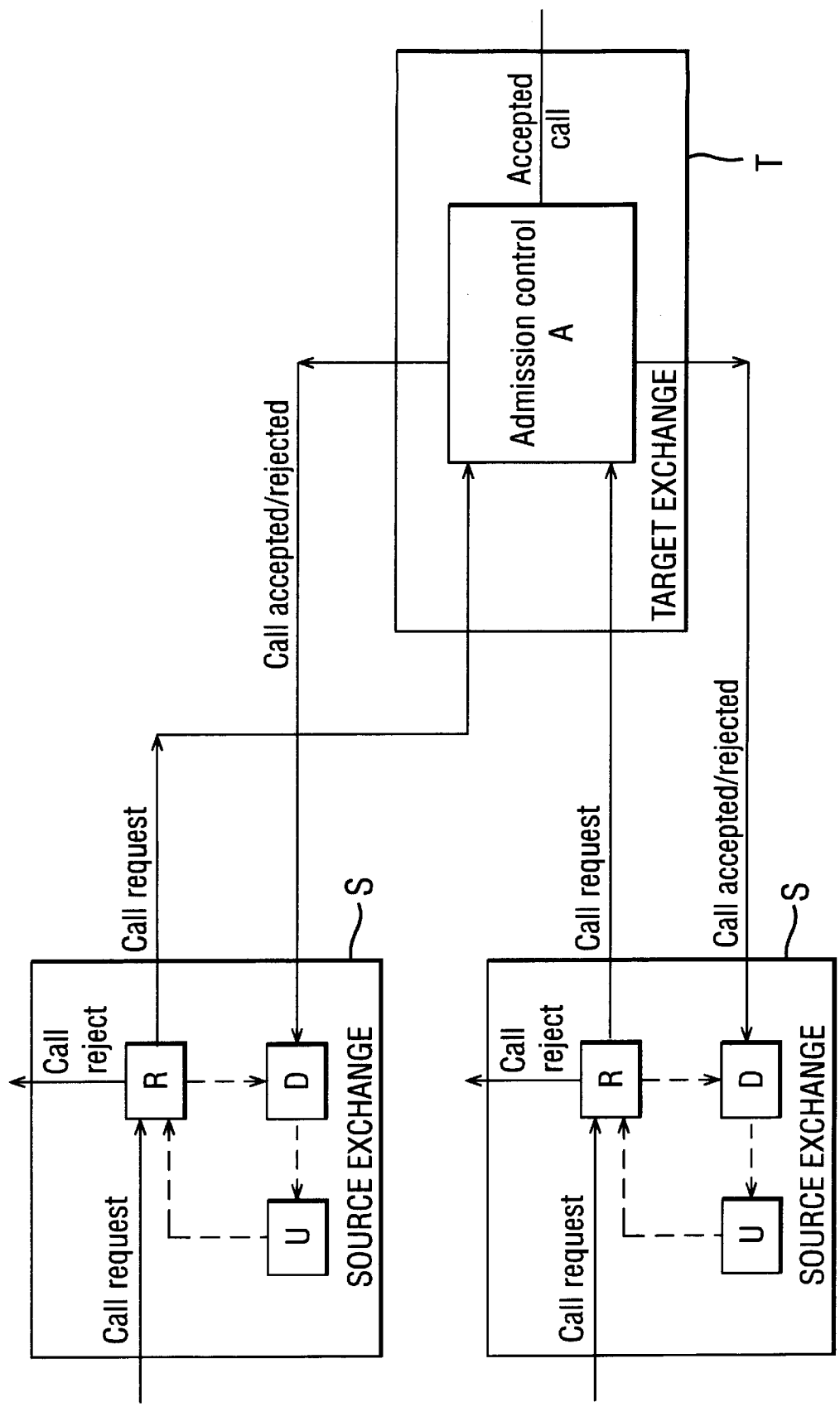
FIG. 1 is a diagram illustrating a telecommunications network in which overload control is undertaken.

Two preferred methods of automatic congestion control (ACC) will now be described, specifically two Remote Overload Control methods for SS No.7 ISDN User Part (ISUP), i.e. methods for overload control at a source exchange. The two methods are both adaptive rate based automatic congestion control (ACC) schemes satisfying the requirements of the relevant standards. Both first and second methods automatically adjust for short and long term variations in target exchange capacity during overload. Short term variations can occur because of the nature of the overload traffic itself, long term variations can occur, for example, because of software or hardware changes at the target exchange, or changes in the number or size of source exchanges in the network.

The first method requires continual measurements of calling rates both offered by the source exchange to the target exchange, and rejected by the target exchange from the source exchange. In order to lift the ACC, measurement of calling rates offered to the source exchange for the target exchange are also required once ACC starts.

In the first preferred method, it is not essential to signal the fact of overload from target to source initially. Since the method requires source nodes to monitor the load offered them for the target, in an alternative a threshold is defined at which the target is deemed to be overloaded. Restriction of load is then applied. In this alternative case, it would, of course, be advisable occasionally to raise the leaky bucket leak rate slightly in order to test the load condition of the target, any increase in call rejection rates from the target would then cause the leak rate to be adjusted down to the actual capacity of the target, and the offered rate threshold could be adjusted.

The second method does not require measurements to start at the source exchange until a remote exchange (the target exchange) declares it is overloaded. An initial call restriction level is applied at the source exchange, and call rate measurements are started. Once measurements are sufficiently precise, the call restriction can be modified. If a sufficiently long time elapses after the start of overload without the overloaded target exchange sending further indications, and before the traffic offered to the source for the target is sufficiently low, the source decreases slightly the call restriction level, in order to determine the maximum level for calls from the source to the target. The call restriction level applying just before cessation of the ACC is remembered, in order to apply it at a subsequent overload of the remote (target) exchange.

The second method has the advantage that resources at source nodes are not required until a target reports overload. Thus storage can be saved and performance enhanced. In order to cater for target node capacity increase between one overload event and another, a source node uses feedback to estimate target node capacity for calls from itself. This could put the target back into a temporary, but controlled, overload state.

First Method of Congestion Control

The first method uses a mechanism for each outgoing route in each source node, i.e. source exchange in the network. This continually measures in each interval (usually 1 second) the call rate $D_{measured}$ accepted by the route which does not cause overload at the target node. The measurement is smoothed with an exponential smoothing formula to calculate $D_{smooth}$.

The call rates are in units of accepted calls per second. $D_{measured}$ is better taken to be the difference between the number of calls offered by the source to the route in the interval (i.e. for SS No. 7 ISUP signalling the number of initial address messages (IAMs)) minus the number of rejects from the route in the interval (as measured by number of release (REL) messages with an ACL parameter), rather than by the number of address complete messages received.

The calling rate $O_{new}$ offered to the source for the target node is also measured in each interval, with a smoothed value held in $O_{smooth}$.

$D_{smooth}$ is used to determine the leak rate of a notional leaky bucket used to restrict calls to the target node, should it be in overload. $O_{smooth}$ is used to determine when to lift the restriction. Initial values for $D_{smooth}$ and $O_{smooth}$ are set in the source node in configurable data, determined by network and node dimensioning.

If a call is rejected with an ISUP REL message containing an ACL parameter and ACC is not active for the route, then ACC is activated for the route. Timer $T_{short}$ is started for the route. The overload status level of the route is set to the value of the ACL parameter, 1 or 2 for ITU-T ISUP.

Calls to the target are restricted by the source using a leaky bucket whose rate is calculated using an exponential smoothing formula with inputs the current leaky bucket rate $L_{level}$, and $D_{smooth}$. A separate leaky bucket rate and leaky bucket size are used for level 1 and level 2, their initial values being set in configurable date in the source, and determined by network and node dimensioning. (The bucket size, of course, determines what variability in call rates offered to the source exchanges is allowed). The leak rate for the level 2 leaky bucket is set lower than that of the level 1 bucket to enable a sharper reduction in traffic.

Calls rejected by the target during $T_{short}$ are counted but otherwise ignored, except that a REL received during $T_{short}$ with ACL parameter 2, when the current overload level for the route is 1, causes level to be set to 2. At the expiry of $T_{short}$ a timer $T_{long}$ is started for the node. $T_{short}$ is typically 600 ms, $T_{long}$ is typically 12 seconds.

If, during a measurement interval when a timer $T_{short}$ is not running for a target node, that node rejects a call using a REL message containing an ACL parameter with value greater than or equal to the current held value of level, any timer $T_{long}$ running for the target node is stopped, and a short timer $T_{short}$ is started for the target node. $L_{level}$, is updated to the current value of $D_{smooth}$.

If $T_{long}$ expires with level=2, level is decremented and $T_{long}$ is restarted. The leak rate for level 1 is not changed here.

If $T_{long}$ expires with level=1, if $O_{smooth} > L_1$, where $L_1$, is the current leak rate, $T_{long}$ is restarted and neither level nor the leak rate is changed.

This check is to stop oscillation in overload at the target. It ensures that the ACC control is not lifted if the source still has too high an offered load for the target.

If $O_{smooth}$ allows, level is set to 0, and restrictions to the target are removed.

The value of the leak rates for each value of level are remembered, to be used at a subsequent overload of the target node. Measurements of call rates are continued.

Second Method of Congestion Control

The second method differs from the first in that it starts measurements of the overloaded node's capacity only at the report of overload. It applies the stored value of the appropriate notional leaky bucket's leak rate, this can then be modified after a time $T_{short}$ if necessary. The initial value of $L_1$ is remembered by the source node in $L_{init}$.

The value of $T_{long}$ would normally be set to 6 seconds, rather than the 12 seconds of the first solution.

If $T_{long}$ expires with level=1, if $O_{smooth} > L_1$, where $L_1$ is the current leak rate, $T_{long}$ is restarted and level is not changed, as in the first solution.

If $O_{smooth} > L_1$ when $T_{long}$ expires with level=1, $L_1$ is changed if it equals $L_{init}$. Both are then set to $L_{init} = L_1 = L_1 \times$ increase_factor, where increase_factor is a configurable parameter per route, typically 1.03. This "discovery" scheme allows an increase in the calling rate offered by the source to the target, if the target has had an increase in available capacity.

If $O_{smooth} \leq L_1$ when $T_{long}$ expires with level=1, traffic restriction and call capacity measurements are stopped for the target, but the values of $L_{level}$, $O_{smooth}$ and $D_{smooth}$ are remembered for use at a subsequent overload there.

Implementation of the Two Methods

A high level diagrammatic view of how the overload control functions interact in a network is given in FIG. 1.

The target exchange (T) which can be a trunk exchange includes an admission control stage (A) which determines if a call should be admitted or rejected. The admission process is used to drive adaptation of the level of call restriction applied at source exchanges (S) which can be local exchanges. Details of the target exchange's admission control stage (A) are not shown, as these relate to local overload detection and control and do not affect the remote overload control methods.

As shown in FIG. 1, each source exchange (S) has three functional components for remote overload control, labelled D, U and R in FIG. 1. It can be considered that there is one instance in the network of D, U and R per traffic route per exchange. The functionality of the D, U and R components may be summarised as follows:

A detection and monitoring process (D) measures and smoothes the accepted call rate of the target exchange's admission control (A), monitors the call reject rate of the route at each source exchange and measures the call rate offered to the source for the target. If calls are rejected, D informs U of the target's previously accepted call rate.

A restriction update process (U) updates the level of restriction in response to the information received from D; restriction is increased if the target is rejecting calls and its smoothed currently accepted call rate is lower than the currently offered call rate. Restriction is reduced if the smoothed currently accepted call rate is greater than the currently offered call rate.

A restriction process (R) thins the incoming demand stream based on its current level of restriction. This restriction is applied after any restriction due to other non-automatic Network Management controls.

In the first method of ACC, instances of D are always present, and run even when the target exchange is not overloaded. In the second method of ACC, it can be considered that an instance of D is created and runs only when an exchange reports that it is in overload.

The functional stages D, U and R will now be described in more detail, in each case the second method being considered before the first.

Detection and Monitoring Process D (Second ACC Method)

For each outgoing overloaded route, each source exchange contains an instance of the monitoring process D, which keeps a record of the route capacity. This capacity is set up initially using configurable data, the monitoring process updates this by measuring continually, once remote overload has been reported, the call rate accepted by the route which, after the initial overload indication from the overloaded target exchange, does not cause subsequent overload at the target. The measurement is smoothed using the formula $D_{smooth} = \kappa D_{measured} + (1-\kappa) \cdot D_{smooth}$, where $0 < \kappa < 1$ is a constant chosen from modelling according to the route characteristics. Normally, $\kappa$ could be set to 0.2.

$D_{smooth}$ and $D_{measured}$ are in units of accepted calls per second. $D_{measured}$ is best taken to be the difference between the number of calls offered by the source to the route in the interval (i.e. for ISUP signalling the number of IAMs) minus the number of rejects from the route in the interval (as measured by number of REL messages with ACLx), rather than by the number of address complete messages received.

The calling rate $O_{new}$ offered to the source for the target exchange is also measured, with a smoothed value held in $O_{smooth}$.

$O_{smooth} = \beta \times O_{new} + (1-\beta) \times O_{smooth}$, where $\beta$ is normally 0.2

$D_{smooth}$ is used to determine the leak rate of a leaky bucket used to regulate calls, by the restriction process R, to the target exchange, should it be in overload. $O_{smooth}$ is used to determine when to lift the ACC restriction.

If a call is rejected with an ISUP REL message containing an ACL parameter, and ACC is not active for the route, then ACC is activated for the route. Measurements are started for the calling rate offered to the source for the target, for the calling rate the source offers to the target, and for the reject rate from the target. Timer $T_{short}$ is started for the route. The overload status level of the route is set to the value of the ACL parameter, 1 or 2 for ITU-T ISUP. The update and restriction stages U and R for the route are informed of the value of level.

Calls rejected by the target during $T_{short}$ are counted but otherwise ignored by D, except that a REL received during $T_{short}$ with ACL parameter 2, when the current overload level for the route is 1, causes level to be set to 2, and U to be informed. At the expiry of $T_{short}$ a timer $T_{long}$ is started for the exchange.

$T_{short}$ is typically 600 ms. $T_{long}$ is typically 6 seconds.

If, after remote overload has been indicated and $T_{short}$ is not running for a target exchange, that exchange rejects a call using a REL message containing an ACL parameter with value greater than or equal to the current held value of level, any timer $T_{long}$ running for the target exchange is stopped, and the restriction update process U is informed of the value of level and $D_{smooth}$. A short timer $T_{short}$ is started for the target exchange.

If $T_{long}$ expires with level=2, level is decremented. The restriction update process U is informed of the value of level and $D_{smooth}$, and $T_{long}$ is restarted.

If $T_{long}$ expires with level=1, a check is made for $O_{smooth} > L_1$, where $L_1$ is the current leak rate. If this is so, $T_{long}$ is restarted and level remains the same. U is informed so that the leak rate can be adjusted if appropriate.

If $O_{smooth}$ allows, level is set to 0, and D informs U.

When level reaches 0, restrictions to the target are removed.

Detection and Monitoring Process D (First ACC Method)

The difference between the first and the second method is that in the first method a source exchange continually measures each target exchange's call acceptance level, whereas in the second method a source exchange starts measurements for an overloaded target exchange when overload is reported to it. In the first method the restriction update process is informed of the value of $D_{smooth}$ measured just before overload starts, whereas in the second method the value of $D_{smooth}$ used at the start of overload is the one remembered from the previous overload (or, if this is the first overload, a configured value).

Restriction Update Process U (Second ACC Method)

Each source exchange contains an instance of U per overloaded route.

In each concerned source exchange, for each outgoing route when its overload status changes, U notes the overload level and any value of $D_{smooth}$ reported by D for the target.

If the value of level is>0, U informs the restriction process R, and provides the leak rate for R to use. This rate is given by $L_{level}=\alpha \times D_{smooth}+(1-\alpha) \times L_{level}$, where $L_{level}$ is initially configured for the route by modelling and measurements. It is remembered between overload incidents for each route. $\alpha$ is a parameter which is set to 0.5.

If the value of level is=0, U instructs R to stop restriction of traffic to the target.

U remembers the leaky bucket rate to be used when overload is first reported, and stores it in $L_{init}$ for comparison with the actual leaky bucket rate when $T_{long}$ expires with level=1.

If the AC Control is to continue when $T_{long}$ expires with level=1, $L_{level}$ is changed if $L_{level}=L_{init}$ to $$L_{init} \leftarrow L_1 \leftarrow L_1 \times \text{increase\_factor else if } L_{init} > L_{level}, L_{init} \leftarrow L_{level}.$$

increase_factor is a configurable parameter per route, typically slightly greater than one, for example 1.03. This allows an increase in the calling rate offered by the source to the target, if the target has had an increase in available capacity.

Restriction Update Process U (First ACC Method)

The differences between the first method and the second method is that a source exchange using the second method needs instances of U only for overloaded routes. A source using the first method might have inactive instances of U for non-overloaded routes.

Restriction Process R (Second Method)

In each concerned source exchange, for each outgoing restricted route (i.e. the route's/target's level>0) R uses a leaky bucket to throttle calls offered to the target. The bucket size is set to a configurable value per target, the leak rate is that re-computed by U for each remote overload status change.

Restriction Process R (First Method)

This is as for the second method.

Examples of Networks Using the Two Preferred Methods

Figure 2:
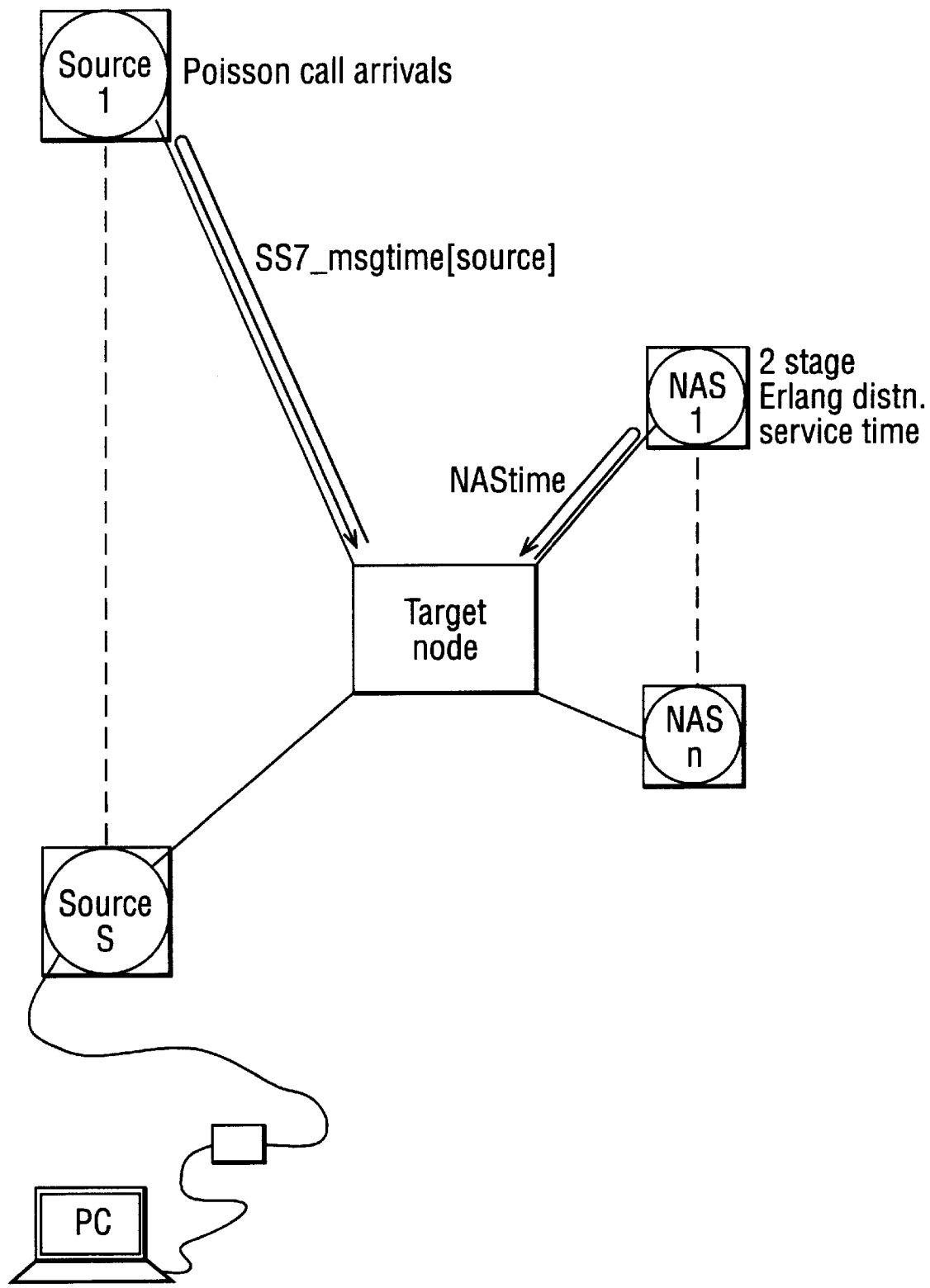
FIG. 2 is a diagram illustrating a network for which the behaviour was determined, using methods for overload control according to the present invention.

The effect of the two proposed remote overload control adaptive ACC methods at the sources nodes (i.e.source telephone exchanges) was determined for a network having the topology shown in FIG. 2. It was assumed that there were 24 source exchanges supplying originating calls to the target exchange. The target exchange made use of up to n (usually 8) Network Access Exchanges (NAS) to connect data paths through from the source exchanges. SS No.7 signalling was assumed from source to target exchange, with ACC being enabled in the target exchange. It was assumed that the target was nominally able to accept 300 calls per second without overload.

The background call rate offered to the sources for the target was assumed to be 300 calls per second from all 24 sources, with a step at the $61^{st}$ second up to 1000 calls per second until the $121^{st}$ second, then 300 calls per second to the $181^{st}$ second, then 1000 calls per second until the $241^{st}$ second, then 300 calls per second. For the runs, the call holding time mean was assumed to be 20 seconds, with a negative exponential distribution. Initially the combined total bucket leak rate for all sources was 300 calls per second for the target's indicated 'moderate' overload level (level 1 corresponding to ACL parameter value 1) and a bucket size of 10 calls, and 275 calls per second for severe overload level (level 2 corresponding to ACL parameter value 2) with a bucket size of 5 calls, but the actual rate per source was assumed proportional to the source size. The timers were $T_{short}$ 600 ms, $T_{long}$ 6 seconds for the sources. The signalling loop delay from target to source was assumed to be 18.5 ms for sources connected to the active side of the target, and 19.5 ms for sources connected to the standby side.

In both cases it was assumed that of the 24 sources, 12 sources were large and 12 sources were small, in the sense that the large sources handled six times as many calls as the small sources.

Figure 3:
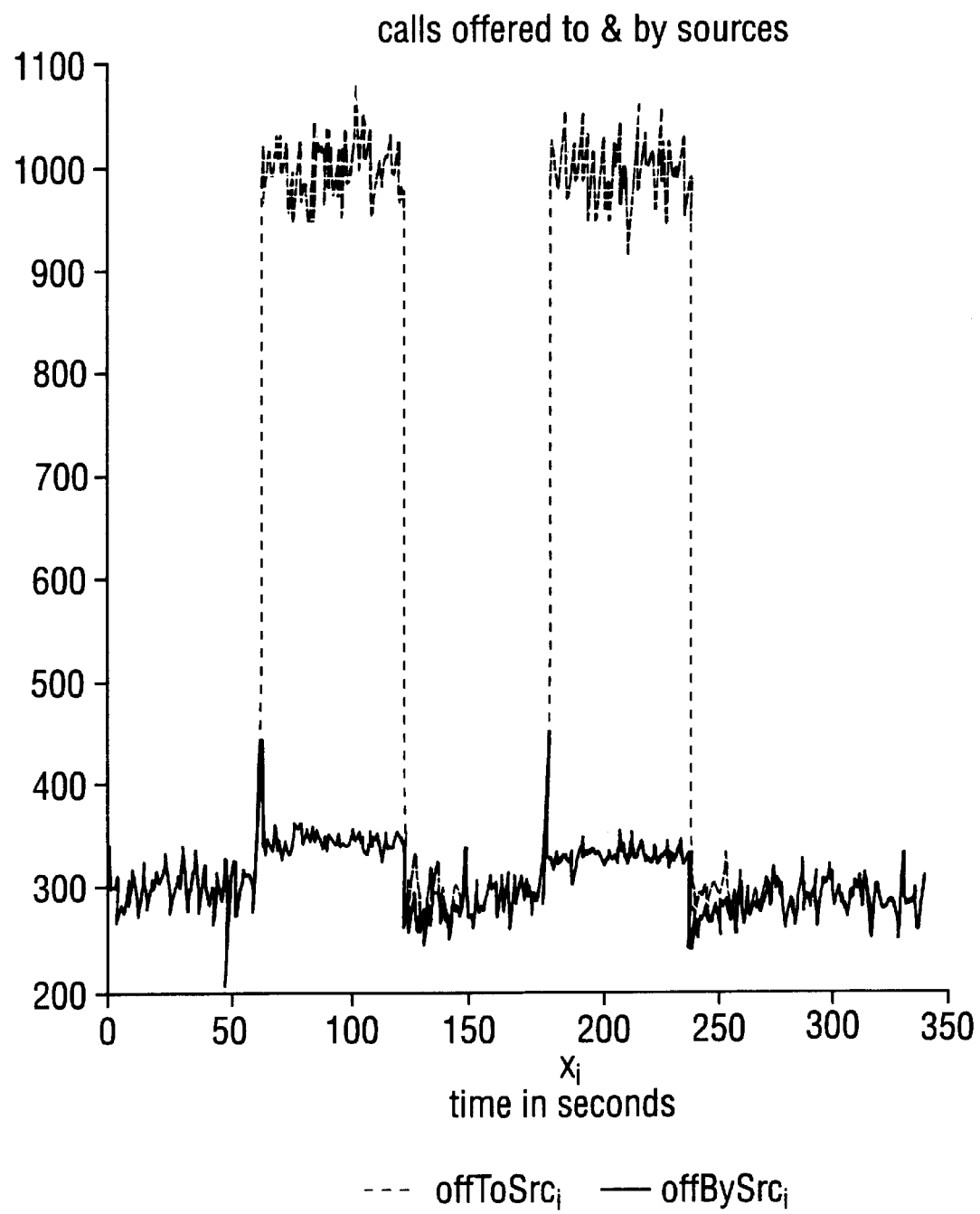
FIG. 3 is a graph showing levels of calls offered to source exchanges and target exchange in the network shown in FIG. 2 with the first preferred method of congestion control.
Figure 4:
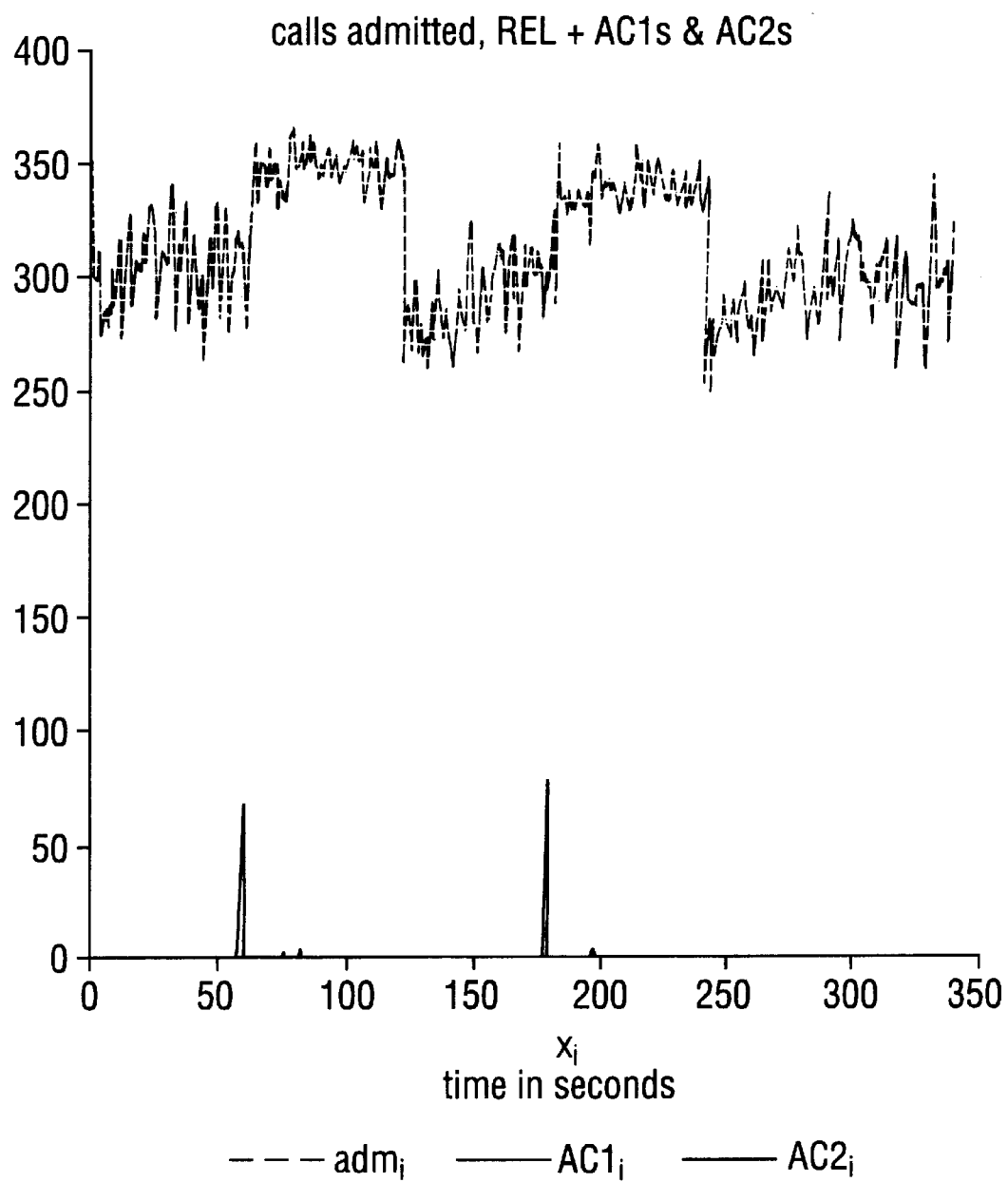
FIG. 4 is a graph showing levels of calls admitted to the target exchange in the network shown in FIG. 2 with the first preferred method of congestion control.

Based on the above mentioned values but with $T_{long}$ set at 12 seconds rather than 6, the results shown in FIGS. 3 and 4 were obtained using the first method of ACC described above. FIG. 3 shows calls offered to sources and by sources to target. FIG. 4 shows calls admitted by target, and calls rejected with REL messages with ACL1 and ACL2.

Figure 5:
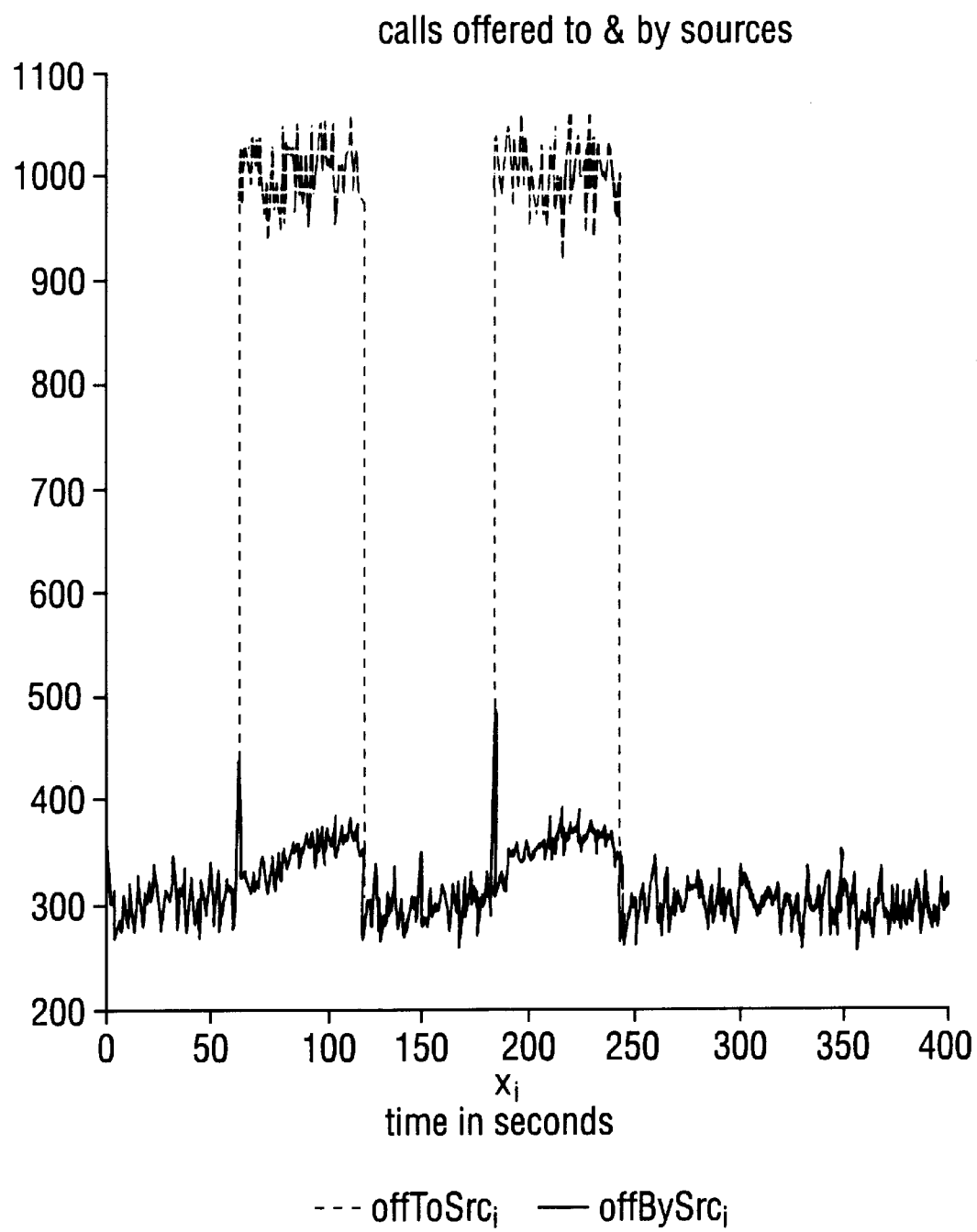
FIG. 5 is a graph showing levels of calls offered to source exchanges and target exchange in the network shown in FIG. 2 with the second preferred method of congestion control.
Figure 6:
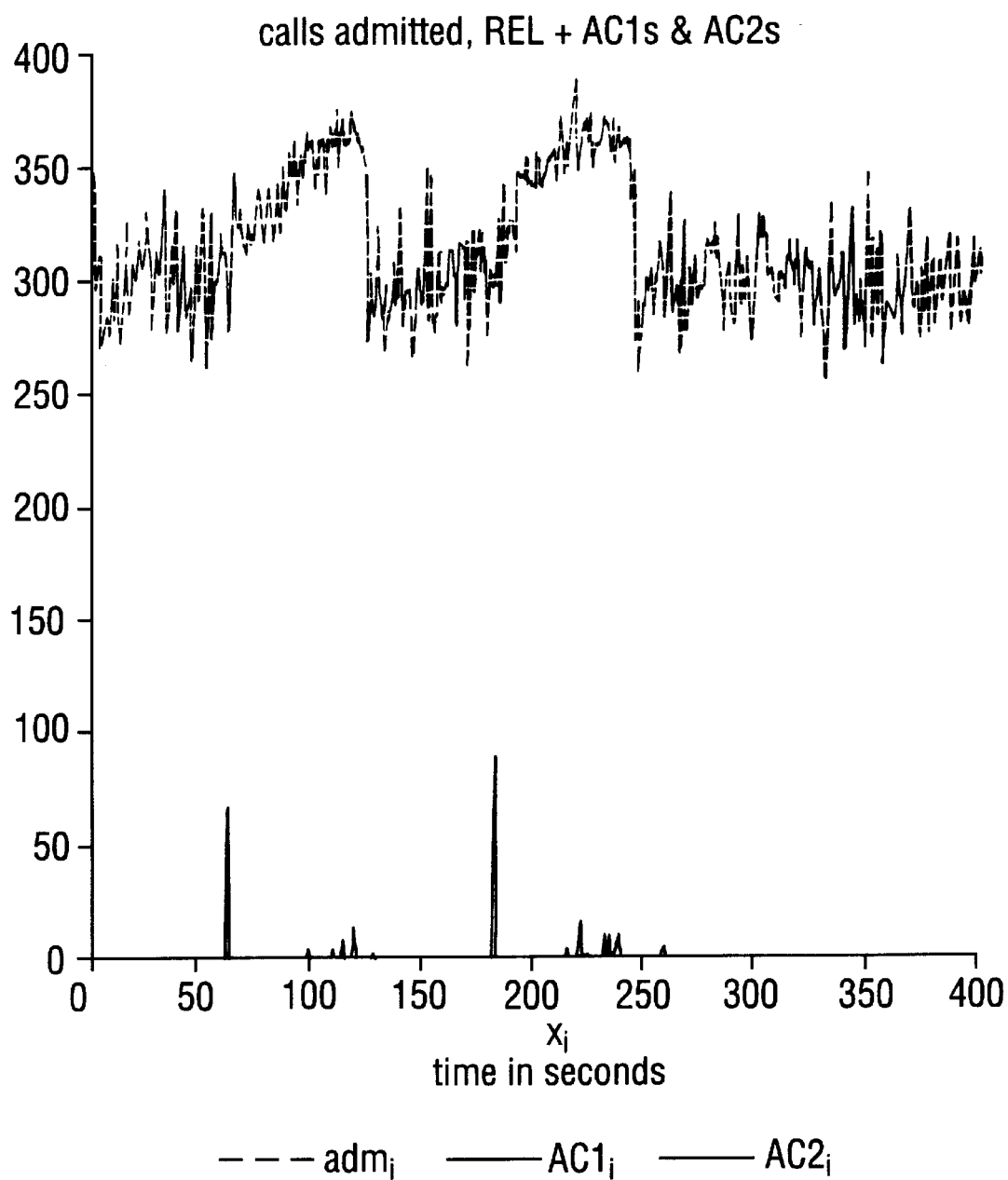
FIG. 6 is a graph showing levels of calls admitted to the target exchange in the network shown in FIG. 2 with the second preferred method of congestion control.

The results shown in FIGS. 5 and 6 were obtained using the same traffic values and network layout as for the first set of results, but the second method of ACC was used instead. Also, an increase factor of 1.03 as explained previously was assumed. FIG. 5 shows calls offered to sources and by sources to target. FIG. 6 shows calls admitted by target, and calls rejected with REL messages with ACL1 and ACL2.

FIGS. 3 and 5 show as a dashed line, the total number of calls per second offered to all source exchanges. The solid line shows calls per second offered to the target exchange by all source exchanges with automatic congestion control according to the respective first or second method operating.

FIGS. 4 and 6 show as dashed lines the call admittance rated of the target exchange with the first and second method of ACC operating respectively. AC1's which are the rate of call releases with ACL 1 parameter are given by the solid spikes at 61 seconds. AC2's which are the rate of call releases with ACL 2 parameter are given by the solid spikes at 61 seconds and 181 seconds. The target exchange is assumed to only release calls under failure conditions, i.e. acting like an internet access switch.

It will be seen from these results that both methods work well. In particular, as can be seen from the Figures, the methods react quickly to a sudden onset of overload; they both keep the target just under an overloaded state during the duration of high offered traffic at the source; and, they do not allow the target to oscillate into and out of an overloaded state.

It will be seen that the preferred methods of ACC allow: the measurement of call rates from the source accepted by the target node, and its use in modifying the leaky bucket rate for call restriction from source to target; the measurement of call rate offered to the source for the target, and its use to determine when to lift the call restriction; and, adaptation of the leaky bucket restriction rate to changes of target capacity caused by modification of the target node or changes in the network.

What is claimed is:

1. A method of suppressing overload of a first node in a telecommunications network by the steps of a second node:
receiving a signal indicating that a call directed from the second node to the first node has been rejected and in response restricting the rate of transmission of calls from the second node to the first node to a predetermined level, and monitoring duration through a predetermined time period wherein if a further signal indicating at a call directed from the second node to the first node has been rejected is receive during the predetermined time period, the rate of transmission of calls from the second node to the first is restricted further to a further reduced predetermined level and duration through a further predetermined period is monitored, in which the steps of restricting and monitoring are repeated until no signal indicating that a call directed from the second node to the first node has been rejected is received during the latest predetermined period, in which if no signals indicating that a call directed from the second node to the first node has been rejected is received during the latest predetermined period a reduced level of restriction is applied, and duration through a further predetermined period is monitored, in which the level of restriction is reduced by increasing allowed call rate by a predetermined factor in the range 1.01 to 1.07.

2. A method according to claim 1 in which the or each predetermined level of restriction is selected dependent upon the measured rate of calls ($D_{measured}$) from the second node accepted by the first node.

3. A method according to claim 2, in which the measured rate of calls successfully transmitted is determined as the number of calls offered to the first node from the second node minus the number of rejected calls in a time interval.

4. A method according to claim 1, in which the or each predetermined level of restriction is dependent on whether the signal indicating rejection of a call indicates severe overload or moderate overload.

5. A method according to claim 1, in which the predetermined factor is, or is about, 1.03.

6. A method according to claim 1, in which the step of reducing the level of restriction is repeated after each predetermined time period in which no signal indicating that a call directed from the second node to the first node has been rejected is received.

7. A method according to claim 1 in which all the restrictions are removed dependent on the call rate ($O_{new}$) of calls offered to the second node for the first node being measured as becoming sufficiently low.

8. A method according to claim 1 in which the rate of calls ($D_{measured}$) accepted by the first node from the second node and rate of call ($O_{new}$) offered to the second node for the first node are measured continually or regularly.

9. A method according to claim 1, in which the rate of calls ($D_{measured}$) accepted by the first node from the second node and the rate of calls offered to the second node for the first node are measured from receipt of the signal indicating that a call from the second node to the first node has been rejected, until restriction(s) are lifted.

10. A method according to claim 1 in which, upon removal of the restrictions on the rate of transmission of calls from the second node to the first node, the latest level of restriction which was applied is stored in a memory for use as the predetermined level to be applied should overload reoccur in the future.

11. A telecommunications network comprising a first node and a second node, the second node comprising receiving means operative to receive a signal indicating that a call directed from the second node to the first node has been rejected, and restricting means operative in response to both restrict the rate of transmission of calls from the second node to the first node to a predetermined level and start its timer to monitor duration through a predetermined period, wherein, in use, if a further signal indicating that a call directed from the second node has been rejected is received by the receiving means during the predetermined period being measured by the timer, the restricting means reduces the rate of transmission of calls from the second node to the first node to a further predetermined level and restarts the timer, in which the restricting means is operative to repeat the restricting and monitoring until no signal indicating that a call directed from the second node to the first node has been rejected is received during the latest predetermined period, in which if no signals indicating that a call directed from the second node to the first node has been rejected is received during the latest predetermined period a reduced level of restriction is applied, and duration through a further predetermined period is monitored, in which the level of restriction is reduced by increasing allowed call rate by a predetermined factor in the range 1.01 to 1.07.

12. A telephone network according to claim 11 which the first node and second node are telephone exchanges.

13. A telephone network according to claim 12, in which the first node and second node are telephone exchanges connected by switch circuitry and trunk lines.

14. A telephone network according to claim 11, in which the first node is connected to a plurality of second nodes, each operative to receive a signal that a call directed from itself to the first node has been rejected and operative in response to both restrict the rate of transmission of calls from itself to the first node.

15. A telecommunications apparatus comprising receiving means operative to receive a signal indicating that a call sent from said apparatus has been rejected, the apparatus comprising restricting means operative in response to restrict the rate of calls sent out and start its timer to monitor duration through a predetermined period, wherein in use, if a further signal indicating that a call sent from said apparatus has been rejected is received by said receiving means during the predetermined period measured by the timer, the restricting means further reduces the rate of calls sent out and restarts the timer, in which the restricting means is operative to repeat the restricting and monitoring until no signal indicating that a call sent from said apparatus has been rejected is received during the latest predetermined period, in which if no signals indicating that a call sent from said apparatus has been rejected is received during the latest predetermined period a reduced level of restriction is applied, and duration through a further predetermined period is monitored, in which the level of restriction is reduced by increasing allowed call rate by a predetermined factor in the range 1.01 to 1.07.

16. A telecommunications apparatus according claim 15 which is a telephone exchange.

* * * * *